3,527,349
SELF-POWERED SELF-CLEANING DEBRIS
REMOVER
Thomas L. Lynch, Rte. 3, Box 711C,
Yakima, Wash. 98901
Filed Nov. 19, 1968, Ser. No. 777,031
Int. Cl. B01d 33/06
U.S. Cl. 210—156  7 Claims

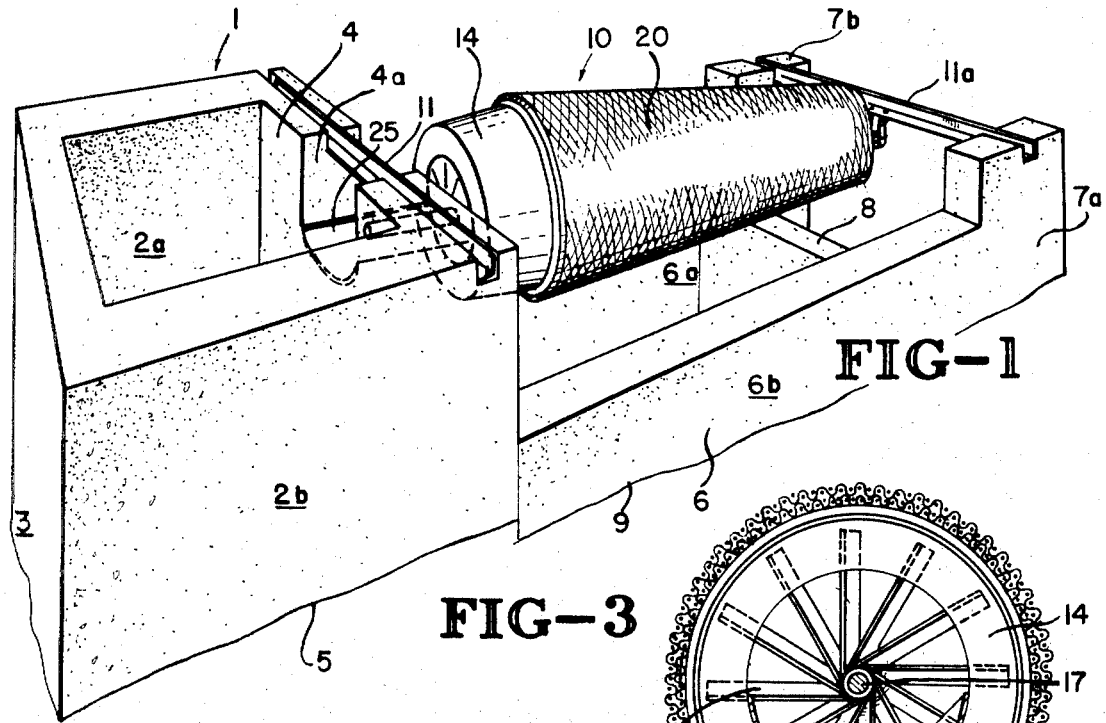
FIG-1
FIG-3
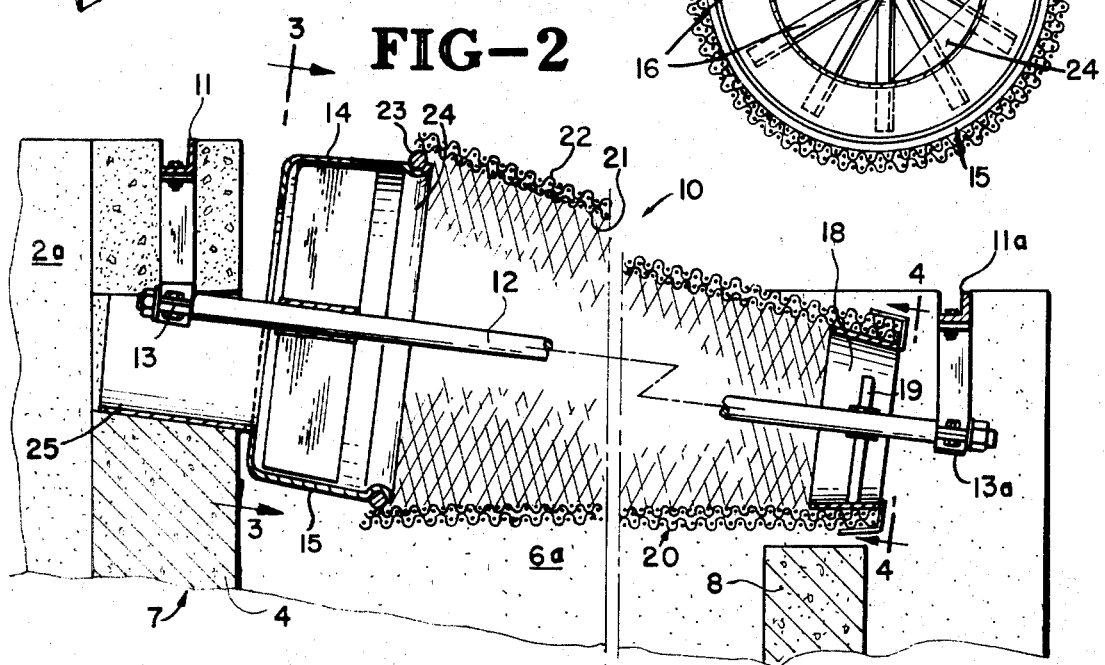
FIG-2
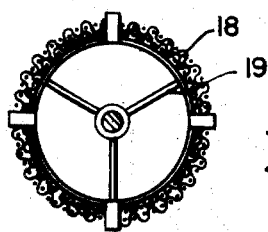
FIG-4
THOMAS L. LYNCH
INVENTOR.
BY Segal, Berry + Dowrey
ATTORNEYS United States Patent Office 3,527,349
Patented Sept. 8, 1970

ABSTRACT OF THE DISCLOSURE

A self-cleaning, self-powered apparatus is disclosed for removing debris and other foreign matter from irrigation canals or conduits. The apparatus comprises a debris removing member resembling the frustrum of a cone mounted in a housing such as a concrete box for rotation about its axis just below the level of incoming water. The debris removing member includes a water turbine in its inlet end having blades adapted to receive the impact of water flowing therethrough for propelling the debris removing member. A fine mesh screen overlaid with a screen of larger mesh forms the peripheral surface of the debris removing member and allows the water flowing into it to pass through while retaining substantially all the debris. The debris processes through the debris removing member and is ejected at its outlet end.

BACKGROUND OF THE INIVENTION

Field of the invention

This invention relates to an apparatus for removing debris from a fluid stream, the apparatus operated by the fluid stream.

Prior art relating to the disclosure

Devices have been proposed for removing debris such as weeds and other seeds, bits of moss, small roots, etc. from an irrigation stream. Exemplary of such devices are those disclosed in U.S. Pat. 3,061,103 and U.S. Pat. 3,151,068. In contrast to the debris removers disclosed the present apparatus is readily adapted to manufacture, is substantially less in weight, low in cost and simply operated. There is no necessity for the complicated conveyors and gear trains such as are associated with the prior art machines.

Summary of the invention

This invention relates to a self-powered, self-cleaning apparatus for removing debris from a water stream, particularly an irrigation stream. It is necessary to remove the debris which accumulates in an irrigation canal conduit periodically in order to prevent overflow or clogging of the canal or conduit. At the same time it is advantageous to remove all or substantially all of the weed seeds which accumulate in the irrigation water.

The apparatus of this invention comprises a housing having an upstream water inlet and a downstream water outlet for debris-free water. In the housing is rotatably mounted a frustoconical self-powered debris removing member mounted with its lower surface just below the level of the water in the housing. The frustoconical member is of decreasing diameter in an axial direction and has a peripheral surface which allows water to pass through but retains debris. The peripheral surface of the debris removing means is preferably made of a fine mesh screen overlaid with a larger mesh screen. In the inlet end of the debris removing means is mounted a water turbine having vanes therein arranged to receive the impact of water flowing therethrough for propelling or rotating the debris removing means. Debris present in the water flowing through the apparatus is retained by the screen and is ejected at the outlet end thereof into a suitable container or on the ground.

DESCRIPTION OF THE DRAWINGS

FIG. 1 is an isometric view of the apparatus of this invention as it is most commonly used.

FIG. 2 is a vertical sectional view of the debris remover showing general details of construction.

FIG. 3 is a vertical section along line 3—3 of FIG. 2 showing in more detail the water turbine.

FIG. 4 is a vertical section along line 4—4 of FIG. 2 showing in more detail the outlet end of the debris removing member.

DETAILED DESCRIPTION OF THE INVENTION

FIG. 1 shows the apparatus of this invention mounted in a suitable housing adjacent a weir. Although this is the most common way of using the debris removing member of this invention, it is obvious that it could be mounted in other ways. Reference numeral 1 indicates a weir "box" having side walls 2a and 2b, end walls 3 and 4 and bottom wall 5. End wall 4 has a cutout 4a (weir) for determining the quantity of flowing water delivered to the debris removing member 10.

Attached to end wall 4 is a housing 6 in which the debris removing member 10 is mounted. Housing 6 comprises side walls 6a and 6b having up-raised standards 7a and 7b opposite weir "box" 1, end walls 4 and 8, and bottom wall 9. End wall 8 is of a height such that the outlet end of the debris removing member 10 can extend over the top thereof a short distance. A water inlet (not shown) is provided in weir "box" 1 and a suitable water outlet (not shown) for the debris-free water is provided in housing 6. Supports 11 and 11a, mounted as shown in FIGS. 1 and 2, support the debris removing member 10.

The debris removing means, in its broadest aspect, comprises a frustoconical foraminous member of decreasing diameter in an axial direction having an open inlet end, an outlet end and a peripheral surface open to the passage of water but substantially impervious to the passage of small-size debris. The frustoconical member 10 is mounted on shaft 12 journalled in bearings 13 and 13a carried by supports 11 and 11a. The frustoconical member 10 comprises a cylindrical member 14 of metal or other suitable material at the inlet end in which a conventional water turbine 15 is mounted, the turbine having vanes 16 constructed and arranged to receive the impact of water flowing into frustoconical member 10 from the weir "box" 1. The hub 17, from which the vanes 16 project, is secured to shaft 12 and to cylindrical member 14. At the outlet end of frustoconical member 10 is a second cylindrical member 18 of smaller diameter than the cylindrical member 14. Cylindrical member 18 is also secured to shaft 12 by supports 19.

Interconnecting cylindrical members 14 and 18 is a foraminous surface 20 composed preferably of a fine mesh screen 21 overlaid with a larger mesh screen of expanded metal 22 or other suitable material. The use of two screens is not necessary where the screen used is of sufficient rigidity to support itself. When a screen having a mesh fine enough to retain weed seeds and other seeds is used, however, it is usually necessary to use an overlay screen having greater rigidity to support the fine mesh screen. The screen is welded or otherwise suitably secured at one end to cylinder 18 and at the opposite end to turbine housing 14 by pressing it over rubber gasket 23 mounted in a groove 24 extending around the outer peripheral surface of cylindrical member 14. Although other methods can be used to secure foraminous screen 20 to cylindrical member 14 the method described is preferred as it allows flexibility in the structure.

A trough 25, extending from the cutout 4a in the weir "box" 1 to the interior of cylindrical member 14 delivers the water from the weir "box" into the inlet end of the frustoconical debris removing member 10. Trough 25 is secured to end wall 4.

FIG. 3 shows the preferred construction of the inlet end of the frustoconical debris removing member 10. Flange 24 is preferably attached to trough 25 as shown to direct water flowing into the inlet end of the debris moving member 10 toward the vanes 16 of water turbine 15 to most effectively use the water.

OPERATION OF THE DEVICE

In operation, irrigation water from weir "box" 1 overflows through cutout 4a and trough 25 into the frustoconical debris removing member 10 where it impinges against vanes 16 of water turbine 15 located in the inlet end. The force of the water impinging on vanes 16 rotates the debris removing member 10. The debris-laden water containing weed seeds and other seeds, bits of moss, small roots, and other debris, then flows into the interior of member 10. The screen 21 may be of sufficiently fine mesh to retain such small particles as weed seeds. The size of the screen can be easily modified if desired. The water flows through screens 21 and 22 into housing 6 and out through the outlet of the housing.

The configuration of the debris removing member 10, because of its decreasing diameter from the inlet end to the outlet end, processes the debris retained on the screen or screens from the inlet end to the outlet end where it is rejected. The outlet end projects over the edge of end wall 8 so that the debris is deposited on the ground adjacent end wall 8 or in a suitable container. As shown in FIG. 2, it is preferable to mount member 10 so that the bottom surface of the foraminous member 20 is substantially horizontal. While the member 20 can be mounted with the outlet end at a lower point than the inlet end, best results are obtained when the bottom surface is maintained in a substantially horizontal position as shown.

The apparatus of this invention is easy to manufacture and is efficient in removing particles such as weed seeds, thus preventing carrying of the seeds to planted fields where they germinate quickly and become a nuisance.

The embodiments of the invention in which an exclusive property or privilege is claimed are defined as follows:

1. A self-powered, self-cleaning debris removing apparatus for positioning in a debris-laden water stream comprising,
   a housing positioned in the path of the water flow having an upstream water inlet and a downstream water outlet for debris-free water,
   a debris removing member mounted for rotation on the housing,
   means for supporting the debris removing member in the housing for rotation about its axis at a level so that the bottom surface of the member is below the level of the incoming water and so that the outlet end thereof projects over the edge of the housing, and
   means for channeling the incoming water to the inlet end of the debris removing member, the debris removing member including
   (1) a shaft,
   (2) a hollow, frustoconical member of decreasing diameter in an axial direction axially mounted on the shaft, the member having a cylindrical inlet end member, a cylindrical outlet end member of smaller diameter than the inlet end member, and a foraminous member joining the inlet and outlet members having a peripheral surface open to the passage of water but substantially impervious to the passage of debris, and
   (3) a water turbine for propelling the member axially mounted on the inlet end of the member and arranged to receive the impact of water flowing into the inlet end thereof.

2. Apparatus according to claim 1 wherein the debris removing member includes
   an open cylindrical inlet member of sufficient diameter and size to enclose the water turbine,
   an open cylindrical outlet member of smaller diameter than the inlet member, a foraminous member composed of an inner fine mesh screen overlaid with an outer screen of larger mesh, the two screens interconnecting and encircling the inlet and outlet members so that the overall appearance of the debris removing member is that of a frustrum of a cone.

3. Apparatus according to claim 2 wherein the cylindrical inlet member includes a depressed groove adjacent the point where it joins the foraminous member, the groove extending around the outer periphery thereof, and a deformable gasket inserted into the groove whereby the foraminous member can be flexibly secured to the cylindrical inlet member.

4. Apparatus according to claim 1 wherein the cylindrical debris removing member is mounted so that its bottom surface is substantially horizontal.

5. Apparatus according to claim 1 including means mounted in front of the water turbine for directing the incoming water into the water turbine.

6. Apparatus according to claim 1 wherein the housing comprises substantially parallel side walls parallel to the flow of water, an upstream end wall adapted to meter incoming water into the inlet end of the debris removing member, and a downstream end wall of a height such that the outlet end member of the debris removing member can project thereover.

7. Apparatus according to claim 1 including means for metering a determined quantity of water to the debris removing member.

References Cited

UNITED STATES PATENTS

| | | | |
|---|---|---|---|
| 1,157,009 | 10/1915 | Lala | 210—354 |
| 1,993,214 | 3/1935 | Hass | 210—489 X |
| 2,730,242 | 1/1956 | Samuel | 210—354 |
| 3,151,068 | 9/1964 | Long et al. | 210—354 X |

REUBEN FRIEDMAN, Primary Examiner

T. A. GRANGER, Assistant Examiner

U.S. Cl. X.R.

210—497